Figure 1:
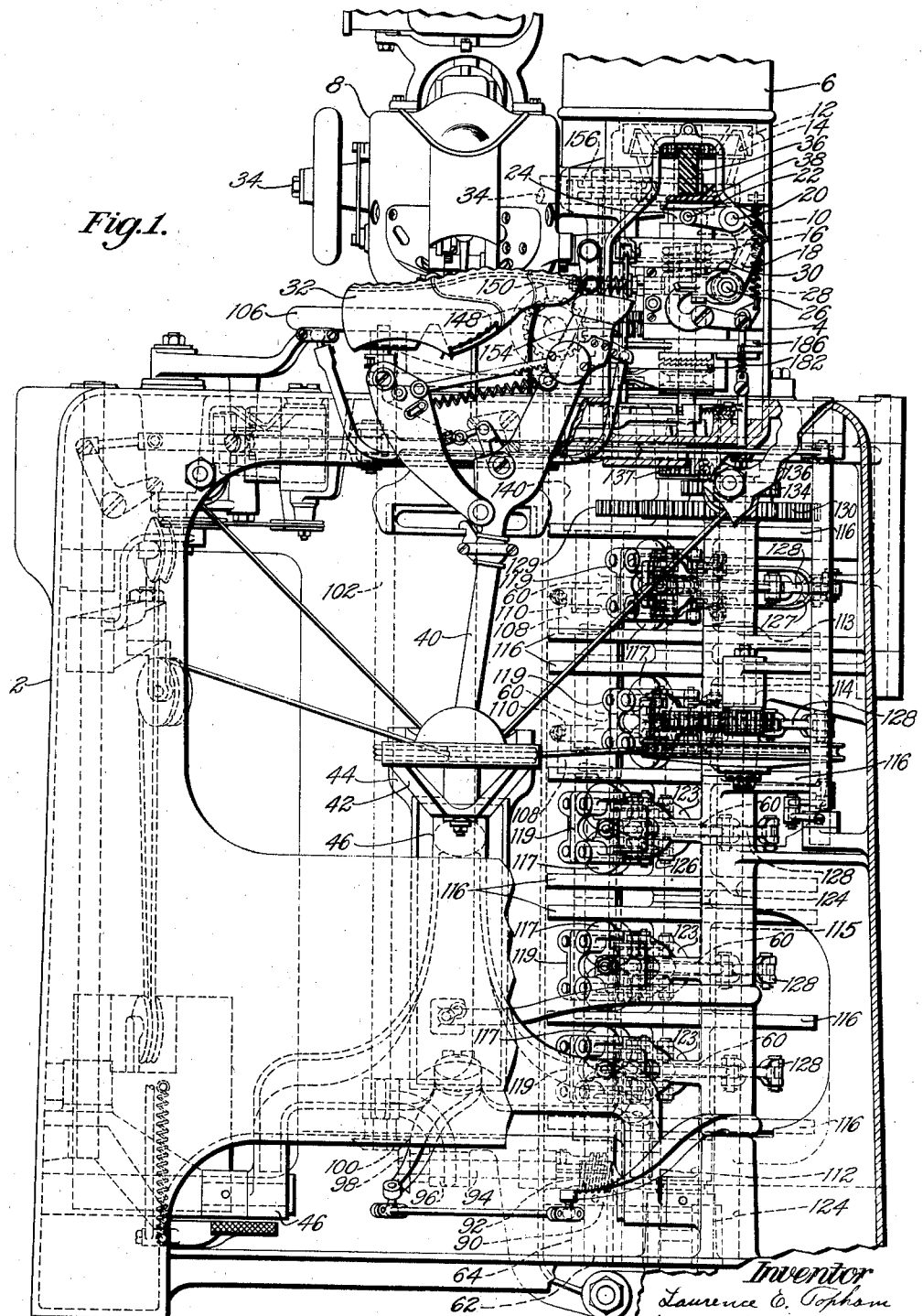

July 13, 1937.  L. E. TOPHAM  2,086,929
MACHINE FOR USE IN THE MANUFACTURE OF SHOES
Filed Feb. 7, 1936  12 Sheets-Sheet 1

July 13, 1937.  L. E. TOPHAM  2,086,929
MACHINE FOR USE IN THE MANUFACTURE OF SHOES
Filed Feb. 7, 1936  12 Sheets-Sheet 2

Witness
Frank A. Wright

Inventor
Laurence E. Topham
by Fish Hildreth
Cary & Jenney, Attys.

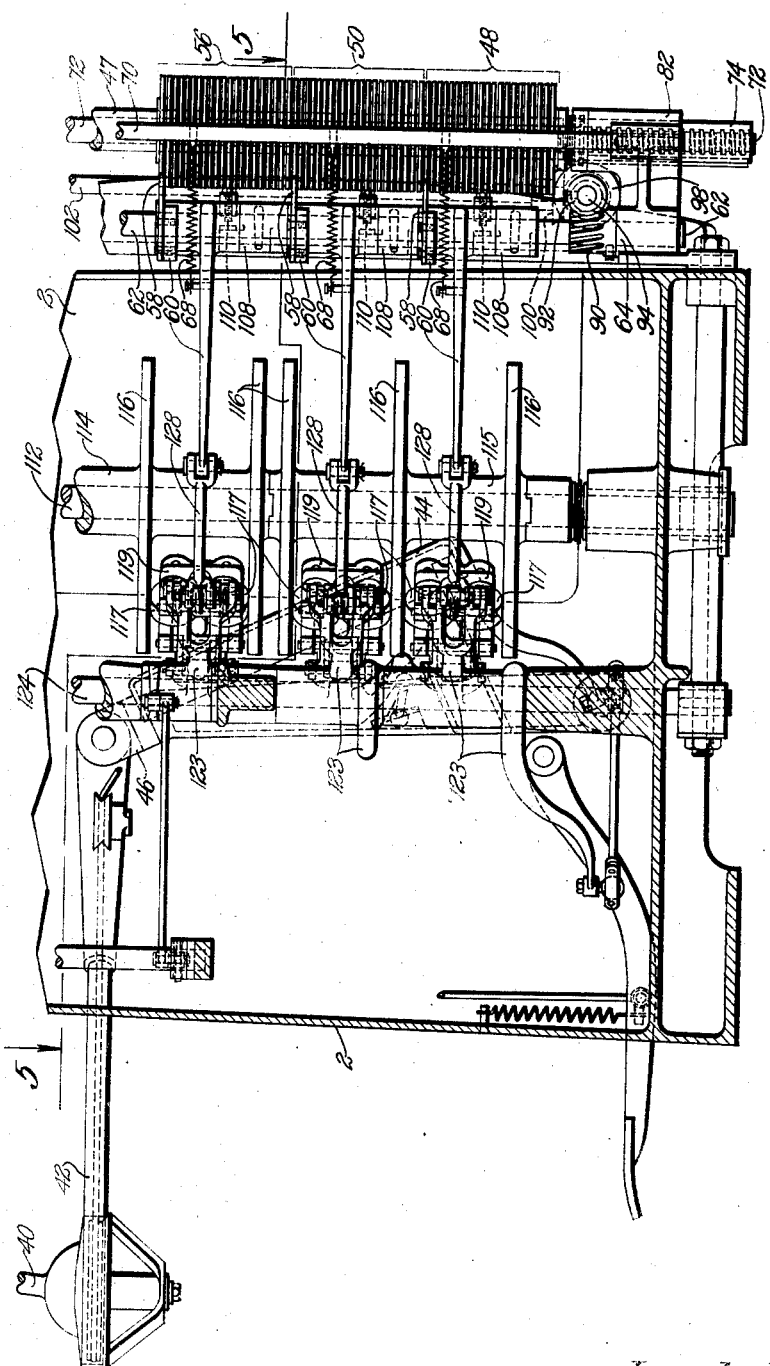

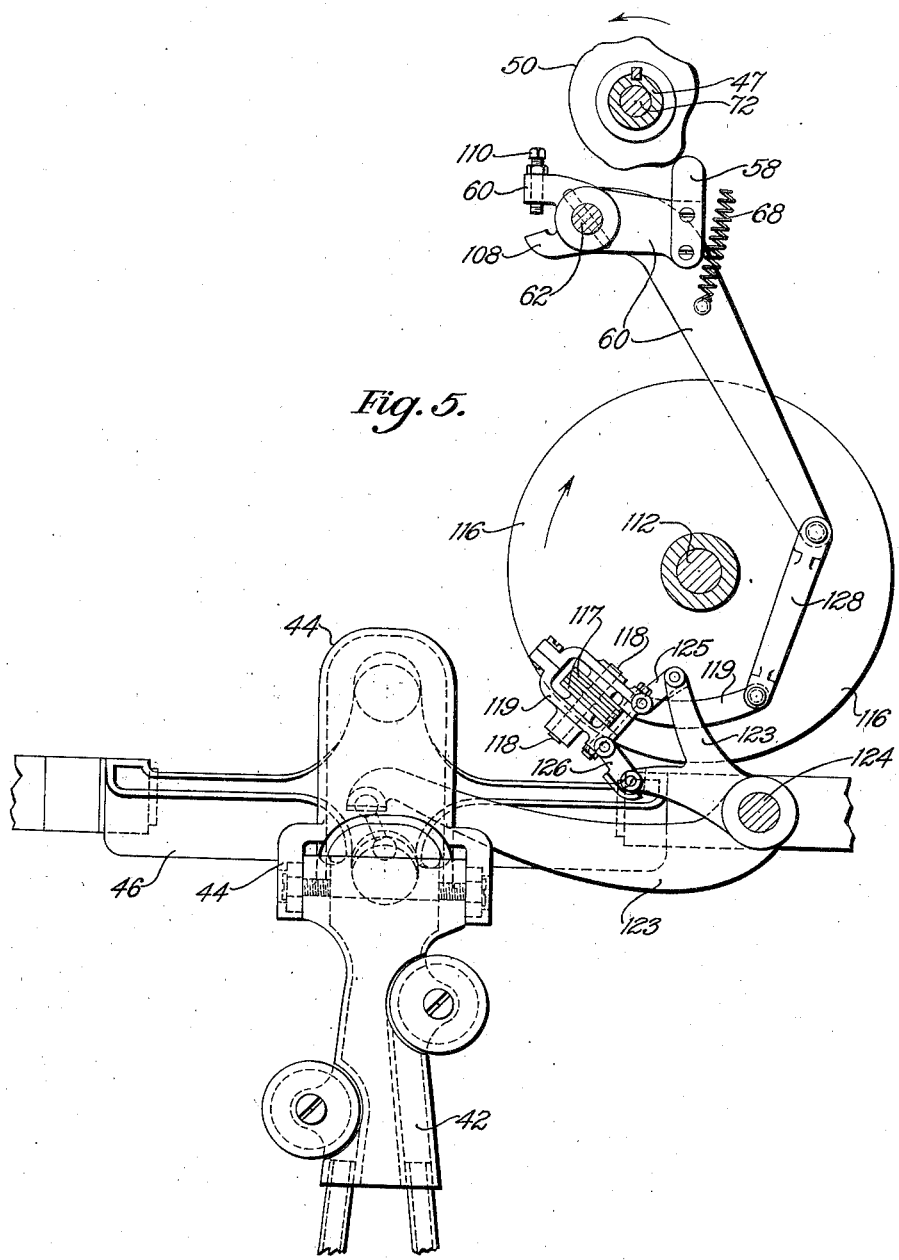

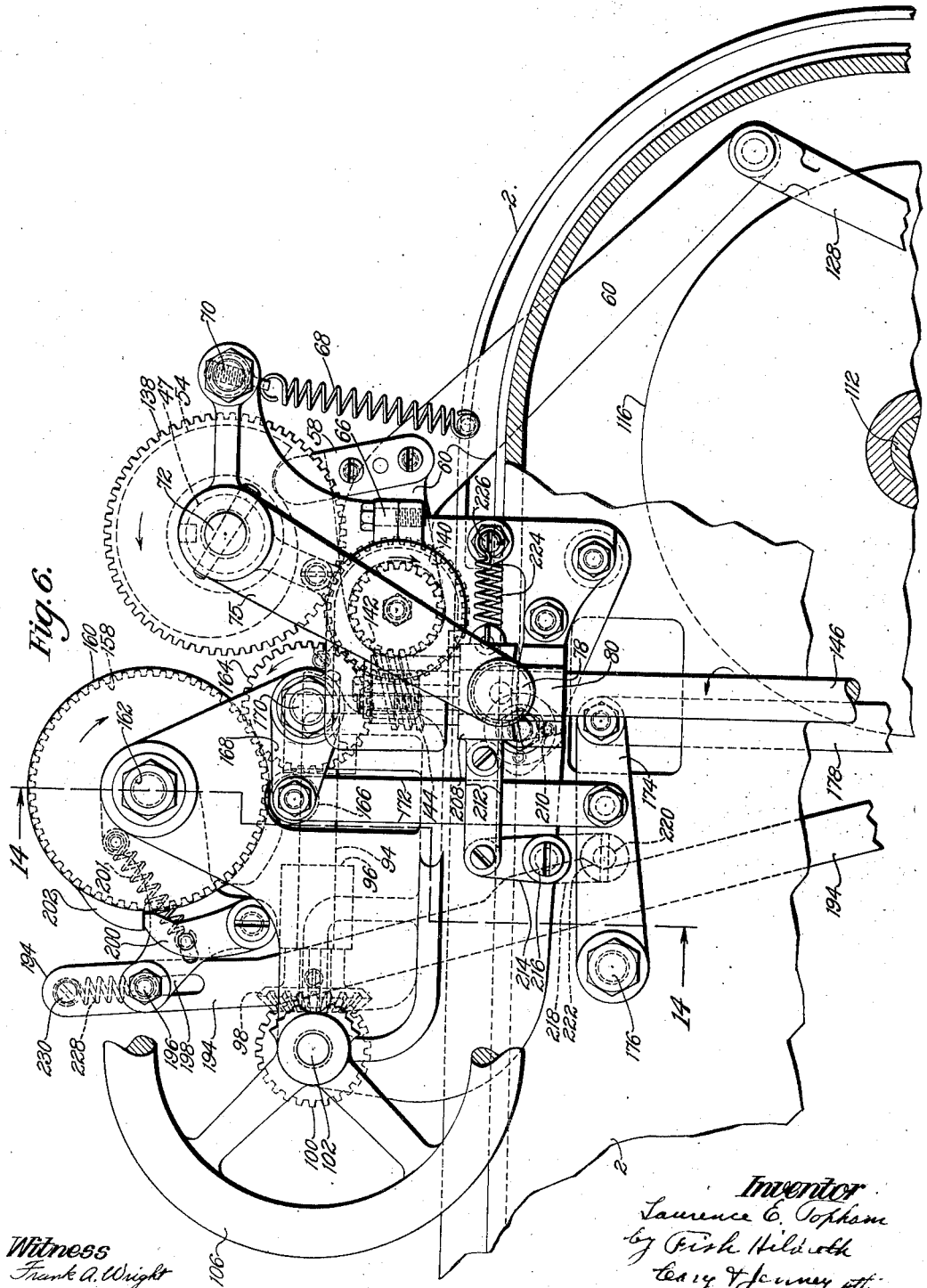

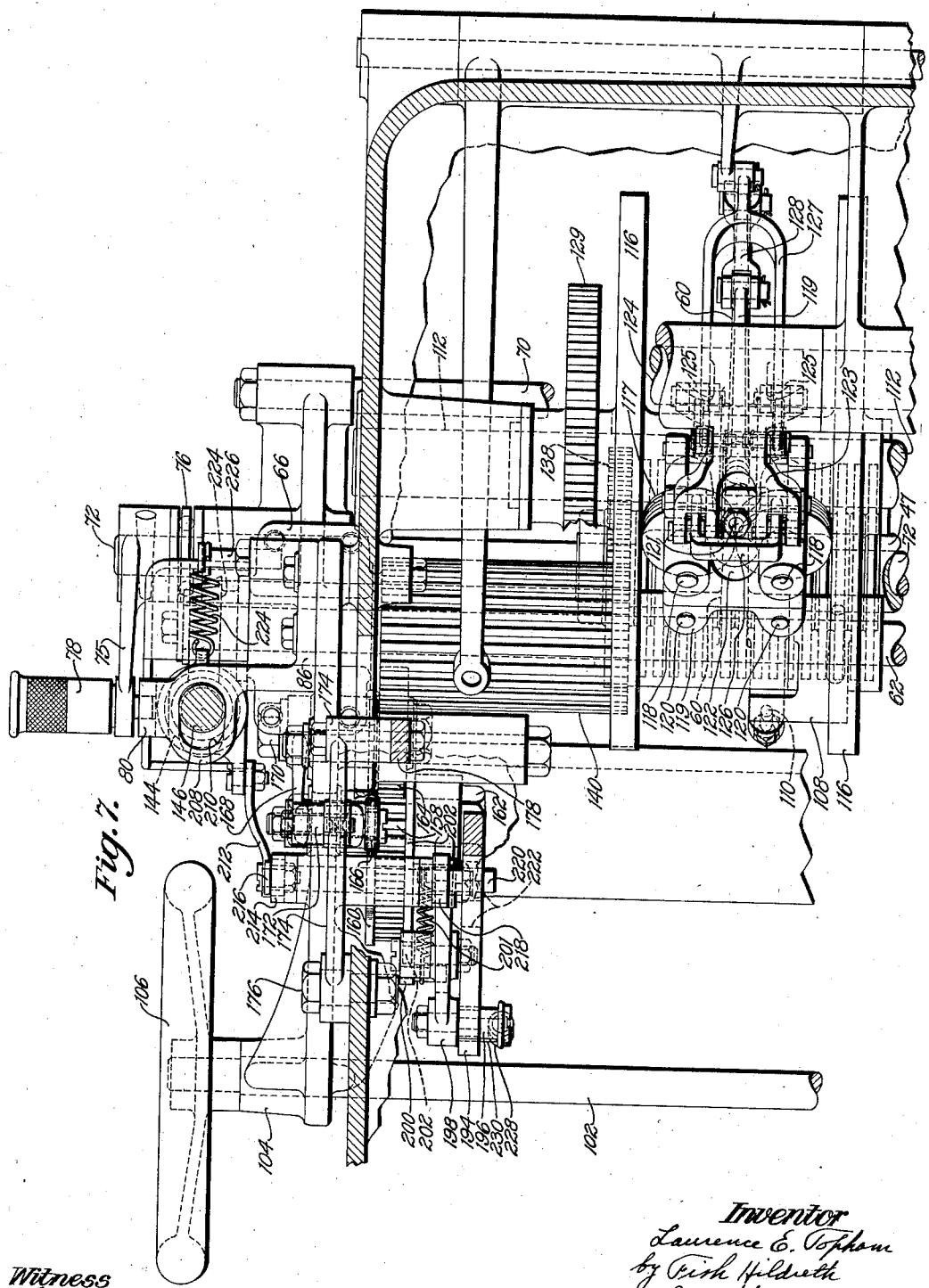

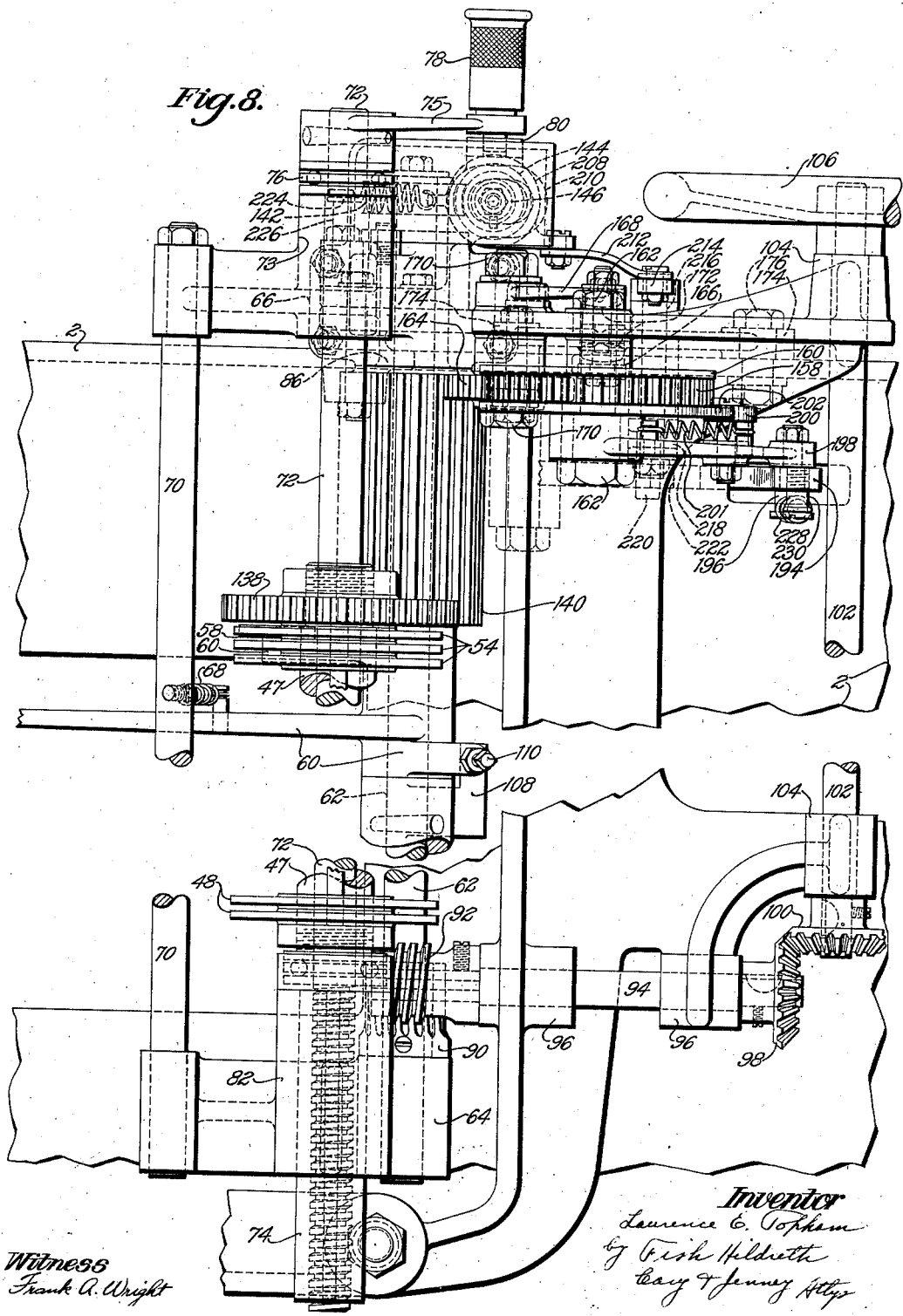

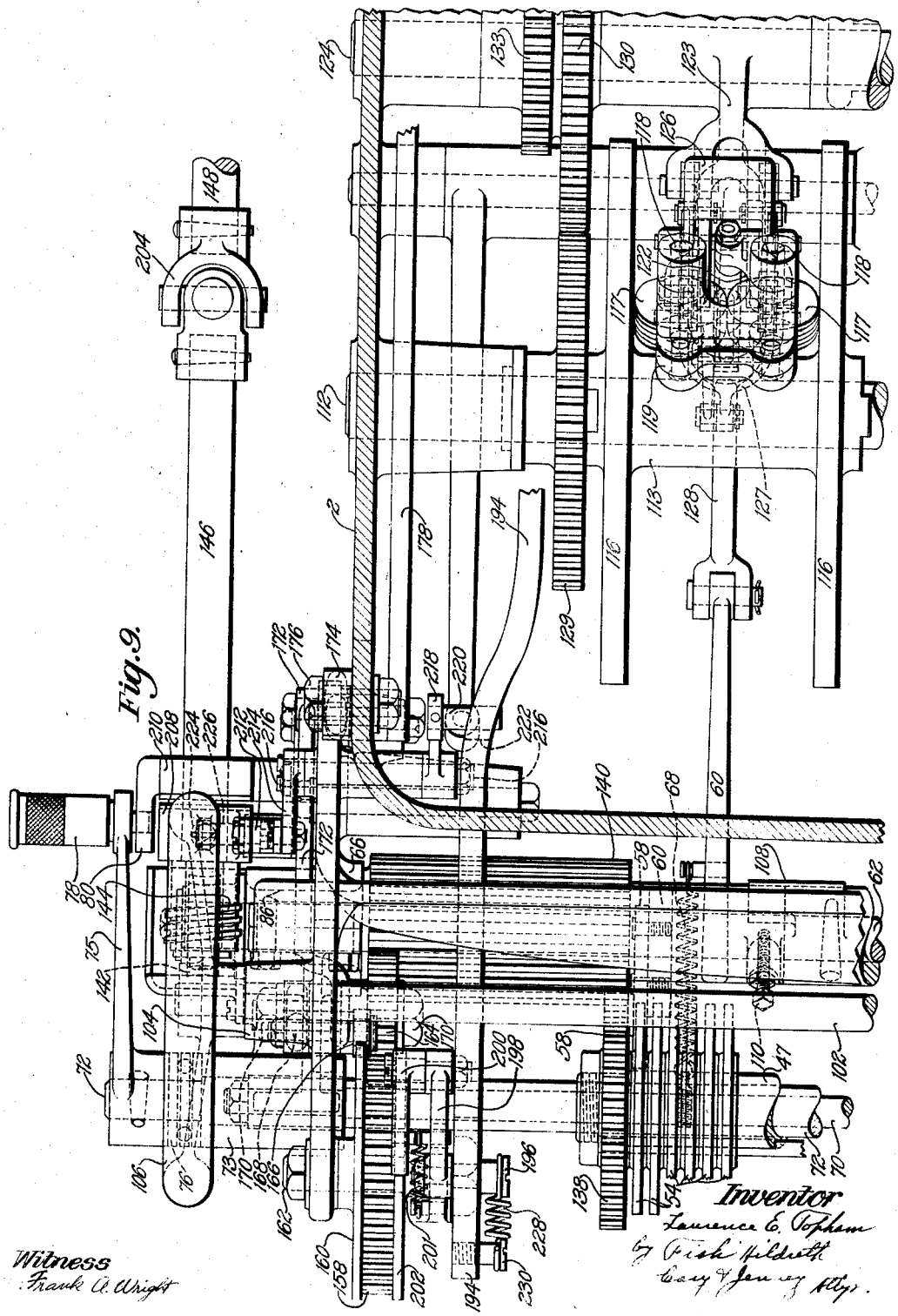

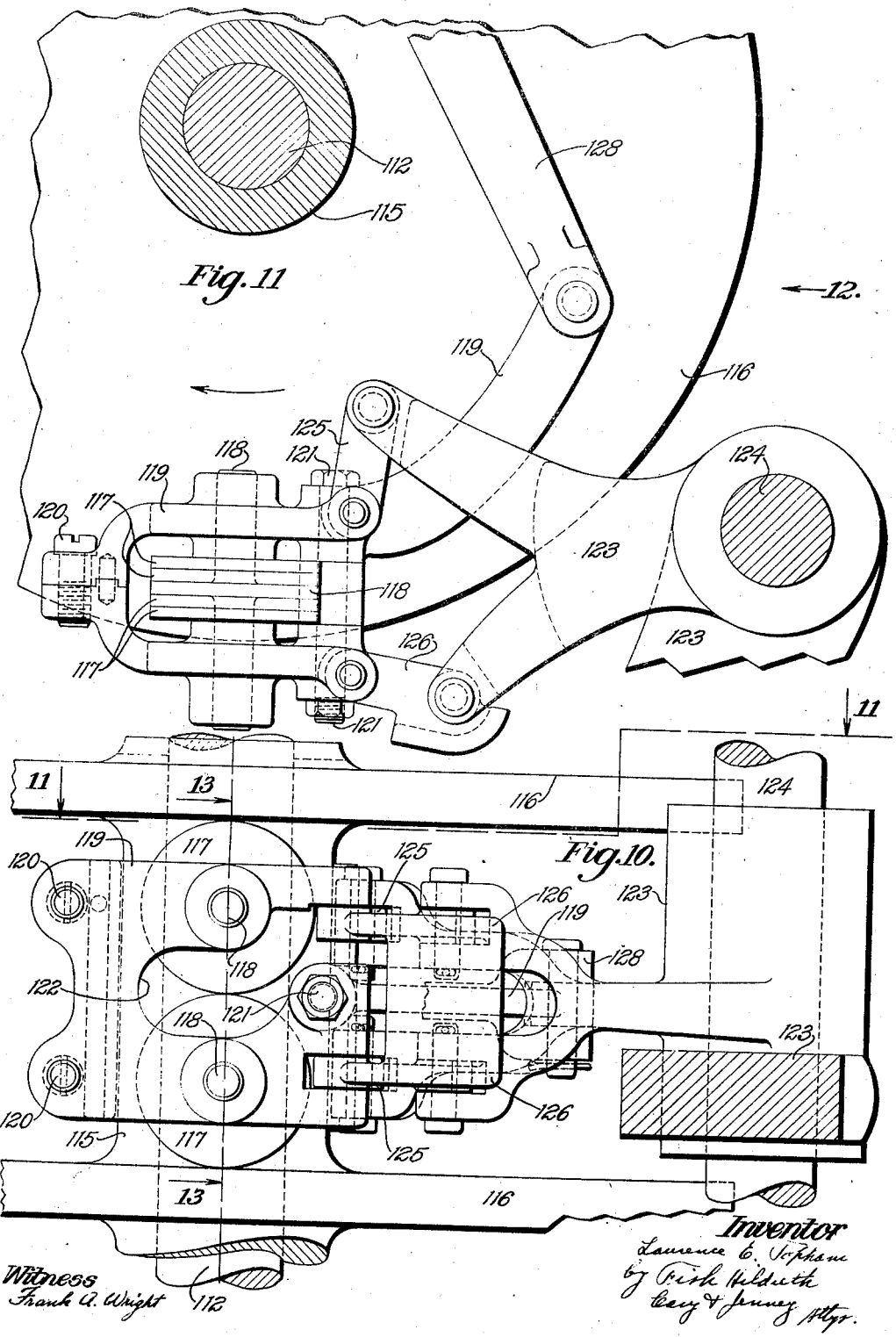

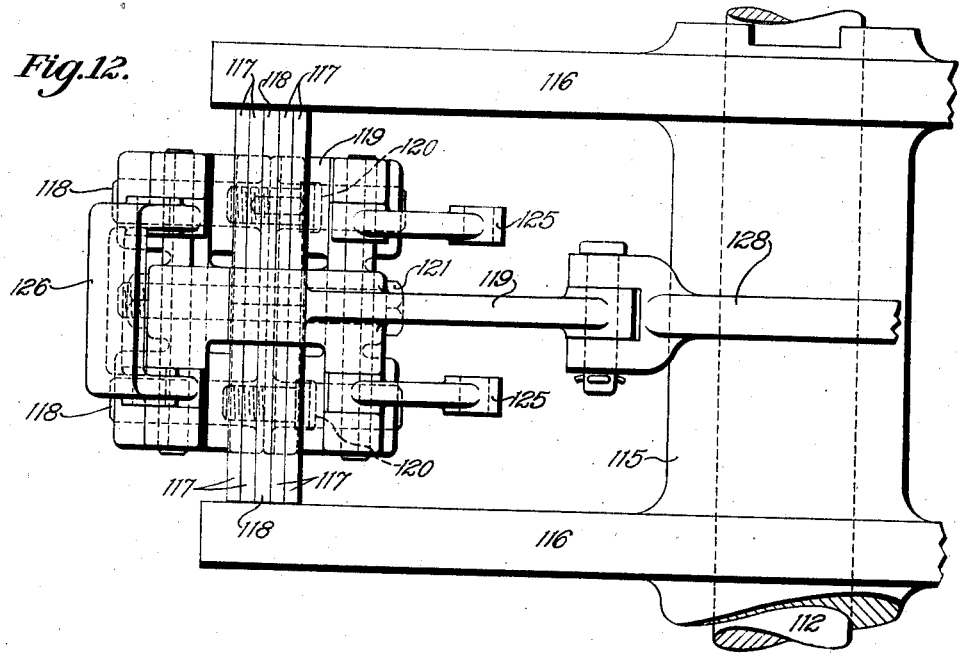
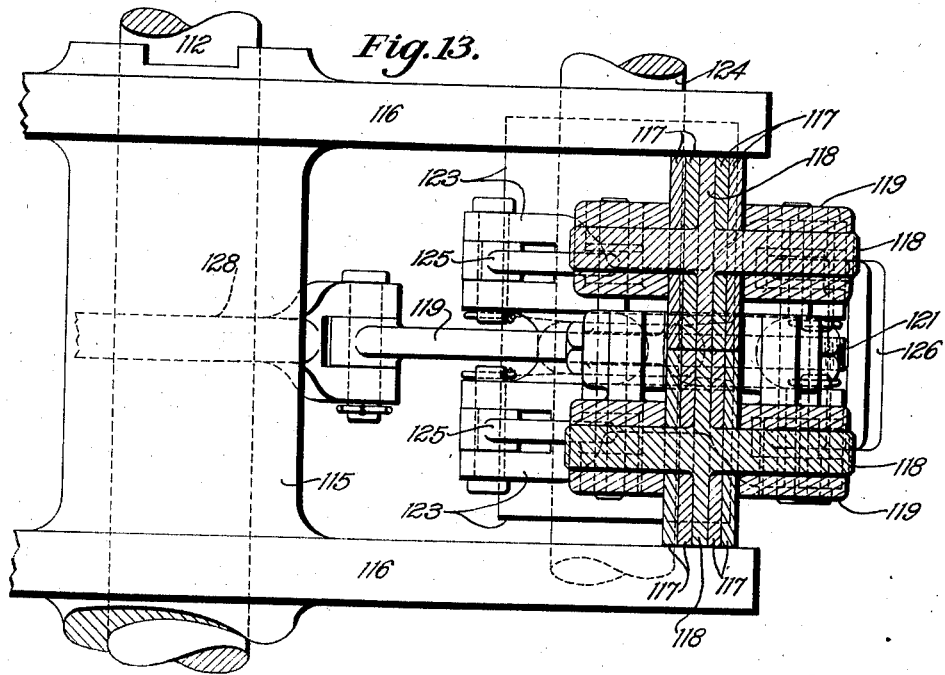

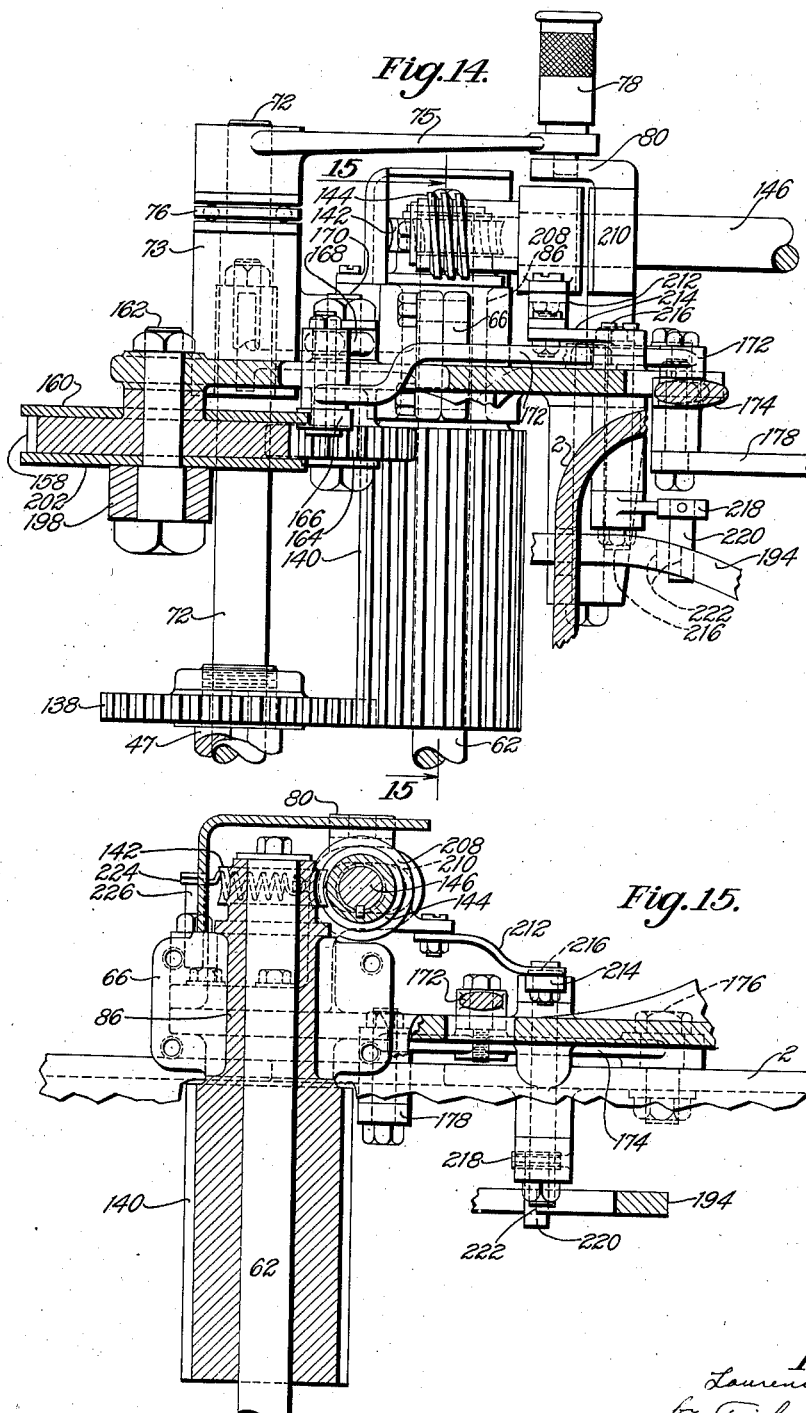

Patented July 13, 1937

2,086,929

UNITED STATES PATENT OFFICE 2,086,929

MACHINE FOR USE IN THE MANUFACTURE OF SHOES

Laurence E. Topham, Wenham, Mass., assignor to United Shoe Machinery Corporation, Paterson, N. J., a corporation of New Jersey Application February 7, 1936, Serial No. 62,819

11 Claims. (Cl. 12—17)

The present invention relates to machines for use in the manufacture of shoes, and more particularly to machines of the type in which the shoe and the means for operating on the shoe are automatically moved relatively to transfer the point of operation along the shoe, and in which the relative positions of the shoe and the operating means are automatically changed as the point of operation is transferred along the shoe to present the shoe properly to the operating means.

The invention is herein disclosed as embodied in an automatic shoe sewing machine of the same general description as disclosed in U. S. Patents Nos. 1,616,714 of February 8, 1927, and 1,952,770 of March 27, 1934. In a machine of this type, the shoe is mounted in a jack and the jack and the operating means are moved to change the relative positions of the shoe and the operating means by position changing mechanism comprising a pattern cam shaft driven one complete rotation for each shoe operated upon. The pattern cam shaft of the machine is provided with a set of pattern cams to impart relative positioning movements to the shoe and operating means, which movements include pitching about an axis transverse of the shoe length, rolling about the lengthwise axis of the shoe, turning about a substantially vertical axis and feeding lengthwise of the shoe. These movements are each controlled by one cam in the set on the cam shaft. Another additional control over the sewing operation is also provided for by a fifth cam in the set. To permit shoes of more than one style to be sewed in the machine, additional sets of cams for each style of shoe are required. In the machine of the patents, a limited number of additional cams are mounted on the cam shaft in such a way as to permit quick interchange in control for sewing shoes of other shapes and styles.

To insure accuracy in the positioning movements of the jack and operating means, the pattern cams of the machine have heretofore been made of sufficient size to effect the respective positioning movements directly by suitable connections to the operating means and jack. With the smallest size of the cams possible to obtain good results, there can be accommodated within the machine only a very few sets of cams, so that if it is desired to utilize the machine in the manufacture of shoe styles in addition to those provided for by the limited number of sets of pattern cams already in the machine, additional sets of cams must be stored outside the machine in factory space which frequently is not conveniently available. Besides taking up space outside the machine, the cams in the machine cannot be readily replaced without putting the machine out of operation for a period of time.

It is, accordingly, the objects of the present invention to improve generally the operation of an automatic shoe machine and to provide novel mechanisms therein by which the proper relative positioning movements of a shoe and operating means may be imparted by any of a much larger number of cam sets than has been possible to carry, heretofore, ready for immediate use without replacement or complicated adjustments in a machine of this type. A further object of the invention is to provide a novel and improved automatic machine of the type referred to, in which the relative positioning movements of the operating means and jack are produced more accurately than in prior machines.

In order to permit cams of very small size to be employed, so that a large number of sets of cams may be mounted within the machine, embodying the features of the present invention, the connections for imparting the relative positioning movements to the operating means and jack, as the point of operation is transferred about the shoe, are actuated by separate power driven members, each controlled by one of the cams on the pattern cam shaft to determine the relative movements imparted by the respective power driven member. By providing a separate power driven member to effect each individual positioning movement, the size of the pattern cam which determines this movement needs to be only sufficient to afford accurate control of the connections actuated by said power driven member. As a result, the size of each cam may be reduced greatly and a sufficient number of small cams may be mounted on a pattern cam shaft within the machine to control the relative positioning movements of the operating means and jack for substantially any style of shoe ordinarily manufactured in a shoe factory without increasing the size and weight of the machine to an undesirable extent.

Although the invention is herein illustrated and described as embodied in an automatic shoe machine, certain features of the invention are not limited to use in shoe machines, but may be employed to advantage in other types of machines where there are required compact and efficient mechanisms for imparting relative positioning movements to the operating devices.

Other features of the invention consist in the provision of certain novel and improved construction and arrangement of parts hereinafter described and particularly pointed out in the claims, the advantages of which will be readily understood by those skilled in the art.

Figure 2:
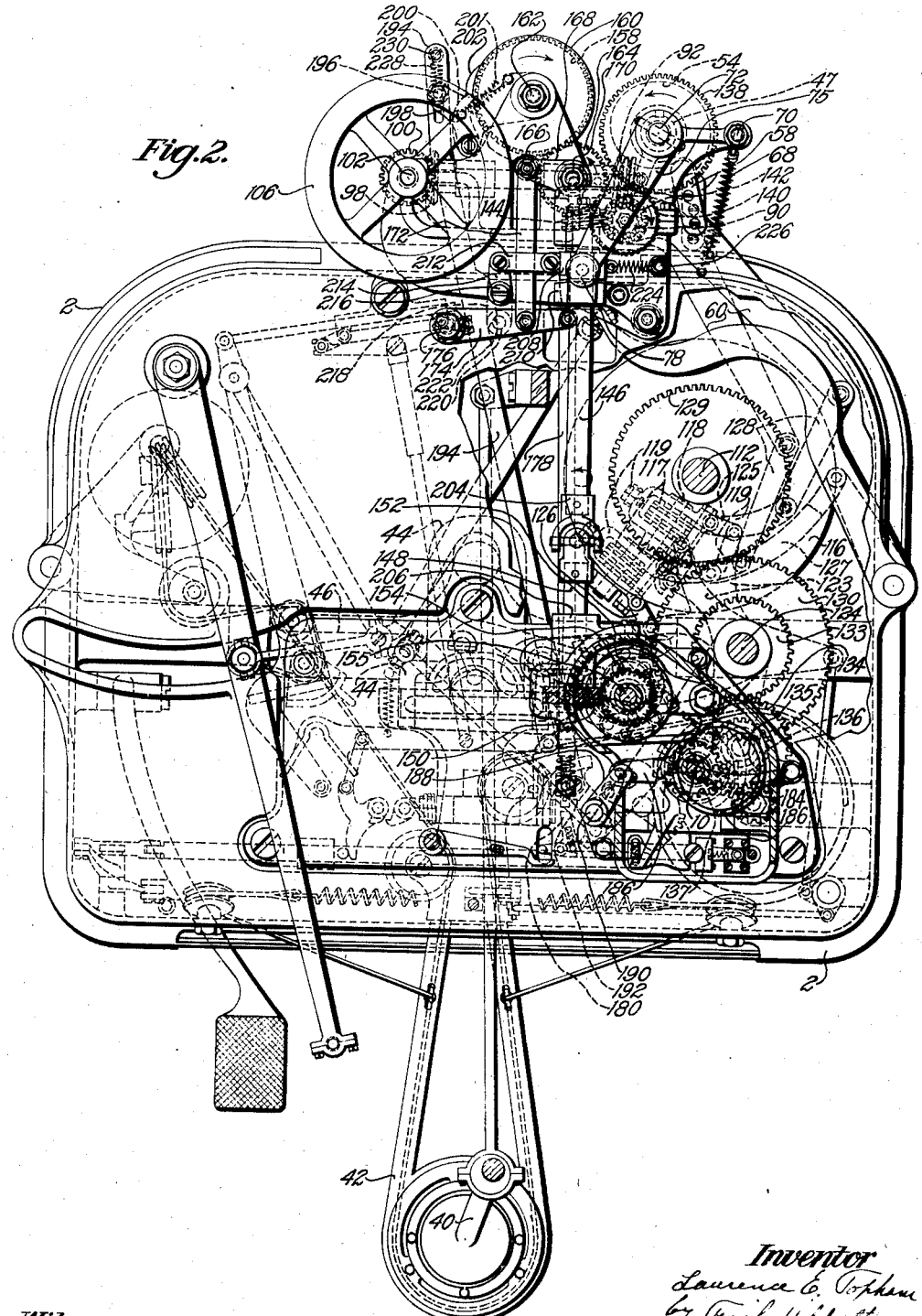
Figure 3:
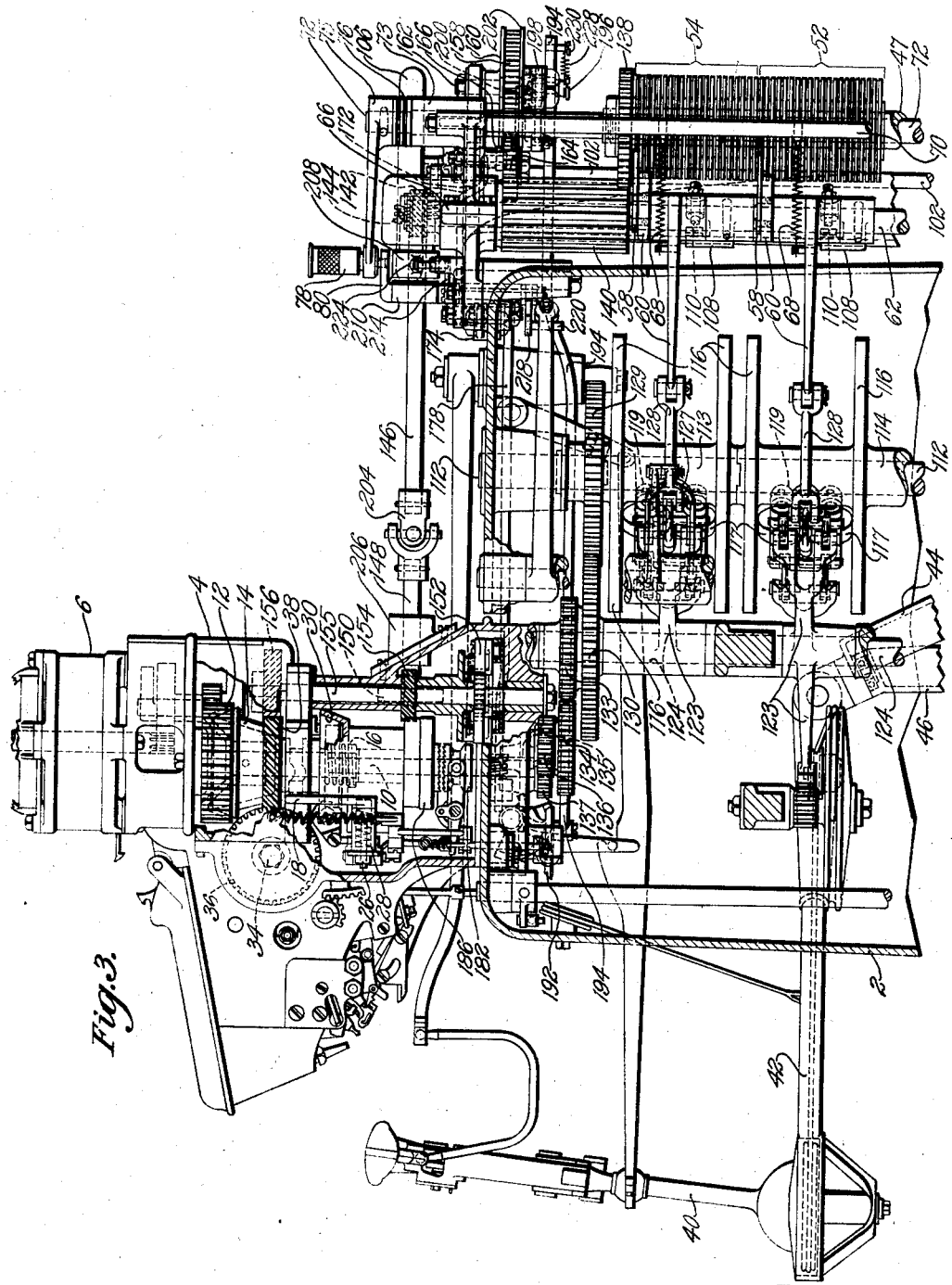

In the accompanying drawings, Fig. 1 is a view in front elevation with certain parts broken away and shown in section, of a welt or turn shoe sewing machine embodying the features of the present invention; Fig. 2 is a plan view of the base portion of the machine, certain parts having been broken away to show the construction; Fig. 3 is a sectional view looking from the right, illustrating parts of the driving and stopping mechanism and the driving connections at the upper part of the machine; Fig. 4 is a similar view of the lower part of the machine base; Fig. 5 is a detail plan view on an enlarged scale of the mechanism for producing a rolling movement of the shoe about the lengthwise axis of the shoe, looking along the line 5—5 of Fig. 4; Fig. 6 is a plan view of the rear portions of the machine on a still larger scale including the general arrangement of the pattern cam shaft and connections thereto; Fig. 7 is a view in front elevation of the upper portions of parts illustrated in Fig. 6, certain of which are broken away and shown in section; Fig. 8 is a view in rear elevation of certain parts at the rear of the machine, the central portions of which have been broken away and the top and bottom portions brought together to illustrate the general arrangement; Fig. 9 is a view in side elevation looking from the left, of the upper portions of the same parts, some of which are broken away or shown in section; Fig. 10 is a view in elevation on a still further enlarged scale illustrating a part of the power driven positioning mechanism shown in Fig. 5; Fig. 11 is a plan view of portions of the same parts as viewed along the line 11—11 of Figure 10; Figure 12 is a view in elevation of certain parts of the power driven positioning mechanism of the machine illustrated in Figure 11, looking in the direction of the arrow 12; Figure 13 is a view of the same mechanism with parts shown in section taken along the line 13—13 of Figure 10; Figure 14 is a sectional view showing the gears for driving the cam shaft, taken along line 14—14 of Fig. 6; and Fig. 15 is a sectional view of the drive gears shown in Fig. 14, taken along line 15—15.

The machine illustrated in the drawings is the same, except as hereinafter pointed out, as the machine of the patents referred to and comprises, briefly, a main base 2, a frame 4 containing the driving and stopping mechanism and supporting a main driving motor, the lower portion of which is indicated at 6, and a frame 8 supporting the sewing mechanism. The motor 6 operates the machine through a continuously rotating vertical drive shaft 10 arranged to rotate continuously while the motor is running. The mechanism in the base 2 and in the sewing frame are driven through suitable gearing from the continuously rotating shaft 10. To bring the machine to rest, there is provided on the shaft 10 a clutch comprising a driving member 12 secured to the shaft, and a driven member 14 through which the shaft passes loosely. The driven clutch member 14 is yieldingly forced against the driving member 12 by a spring 16, and when it is desired to stop the machine, the driven clutch member 14 is disengaged by a driving and stopping mechanism including a bell-crank 18 oscillating about a shaft 20 in the machine frame 4. The bell-crank carries a follower 22 which engages a cam slot 24 in a sleeve attached to the driven clutch member 14 and, when held from oscillation by a lock bolt 26 slidable in a carrier 28 (see Fig. 3) towards and from engagement with an opening in the bell-crank 18, the driven clutch member 14 is disengaged from the driving clutch member 12 and forced into engagement with a stationary brake 30 to bring the machine to rest at a definite point. After the operations on a shoe are completed and the machine is brought to rest, a new shoe may be substituted for the one on which the operation has been completed, and the machine again started by releasing the lock bolt 26 from the bell-crank 18.

The sewing mechanism of the machine herein illustrated is the same as in the machines of the patents above referred to and is arranged to sew the inseam of a welted shoe, indicated at 32. The sewing mechanism is driven by a horizontal sewing shaft 34 having at its right end a helical gear 36 meshing with corresponding gear teeth 38 formed on the driven clutch member 14. The shoe 32, while being sewed, is held in a jack 40 mounted in the base 2. The jack supporting structure comprises an arm 42 in the forward end of which the lower end of the jack is rotatably mounted by means of a gimbal joint, a support 44 upon which the arm 42 is mounted to swing vertically, a frame 46 pivotally mounted at its lower end in the machine base so as to swing about a horizontal axis and upon which the support 44 is mounted so as to swing about a substantially vertical axis.

In the machines of the patents, the positions of the parts of the jack supporting structure are controlled from a pattern cam shaft having a number of sets of cams arranged to be rotated through a complete rotation during operations on a single shoe. The cams rotate with the cam shaft on which they are secured to impart the desired positioning movements to a set of individual followers cooperating with the cams, which followers operate directly the separate parts of the jack supporting structure through suitable connections. There are five cams in each set and there are also mounted on the cam shaft six additional sets of cams which do not cooperate with the followers, but which may be brought into operative relation by means of simple adjustments between the followers and the cams. It is impossible to increase the number of these sets of cams on the cam shaft without undesirably increasing the size of the machine and the space accommodations for the cams and shaft. Neither may the size of the cams be reduced in order to mount additional cams on the cam shaft because such reduction in size will not provide sufficient strength and rigidity to impart directly accurate positioning movements to the jack supporting structure. Therefore, when it is desired to operate upon shoes of a style requiring positioning movements different from any which may be produced by the limited number of cams mounted on the cam shaft, additional cams of the desired shape must be substituted for those in the machine. In order to substitute additional cams, the machines must be put out of operation and more or less dismantled. Also, the sets of cams not mounted in the machine require extra storage space.

Each cam in a set, in the machine embodying the present invention, is formed in substantially the same relative proportions as the corresponding cam in the patented machine, but is of much smaller size, the relative positions of the shoe supporting jack and operating means being controlled only indirectly by the cams. To amplify the motions of the cams, additional power driven actuating mechanism, as hereinafter described, is provided. The cams are mounted on a pattern cam shaft 47 at the rear of the machine and are only sufficient in size and strength to determine accurately the movements imparted by the power driven mechanisms. As a result, there may be mounted on the cam shaft a sufficient number of complete cam sets, each comprising five cams of materially reduced size, to provide proper positioning movements of the shoe for substantially any style of shoe manufactured in a shoe factory. The cams are arranged in groups on the cam shaft 47, and any cam in one group is arranged to determine the movements of the same part of the jack supporting structure that is actuated directly by a larger cam in one of the patented machines.

Referring to Figs. 3 and 4 of the drawings, the different groups of cams, indicated in the drawings at 48, 50, 52, 54 and 56, determine respectively the pitch, roll, turning, and feeding movements of the jack, and also the additional controlling movements imparted to the sewing mechanism. A set of five cam followers consisting of round-ended plates 58 are secured, each to an arm of a separately actuated follower lever 60 rotatable on a vertical shaft 62 close to the cam shaft 47. The vertical shaft 62 is mounted at its lower end in a sleeve bearing 64 and at its upper end in a split bearing 66 in the main frame. To maintain each follower in operative relation with a cam, springs 68 are stretched between the levers 60 and a vertical bar 70 secured to the machine frame.

To permit different sets of cams to cooperate with the followers in determining the positioning movements imparted to the jack supporting structure, the cam shaft 47 is arranged to be adjusted vertically relatively to the followers. To adjust the pattern cam shaft 47, the shaft is constructed in tubular form (see Fig. 5) surrounding a vertical rod 72, the upper end of which is rotatable in a fixed bearing 73 and the lower end of which is threaded in a sleeve 74, carrying the weight of the cam shaft. The upper end of the vertical rod 72 has pinned to it the hub of an adjusting arm 75 supported by a thrust bearing 76 on the upper surface of the fixed bearing 73. At the end of the adjusting arm 75 is a spring pressed plunger 78 arranged at its lower end to enter an opening in a lug 80 on the machine frame. When the plunger 78 is withdrawn from the opening in the lug 80, the arm 75 may be rotated to cause the rod 72 to be turned in the threaded sleeve 74 which is held from rotation, but which is permitted to slide vertically in a sleeve portion 82 of the main frame. The threads on the rod 72 are such that rotation of the rod one complete turn causes the sleeve 74 and the cam shaft to be raised or lowered a distance equal to the spacing of the cams on the cam shaft, so that for each rotation of the rod a different set of cams will be brought into cooperative relation with the followers.

When raising or lowering the cam shaft 47, it is necessary to disengage the followers from the cams, and for this purpose the shaft 62 on which the follower levers are mounted is rotatable at its lower end in the bearing 64, and at its upper end is surrounded by a vertical bushing member 86 (see Figs. 14 and 15) held within the split bearing 66. To the lower end of the shaft 62 is fixed a worm gear 90 meshing with a worm 92 on one end of a horizontal shaft 94 supported in bearing portions 96 of the base 2. The other end of the shaft, as shown in Fig. 8, carries a bevel gear 98 engaging a corresponding gear 100 made fast to the lower end of a vertical shaft 102 rotating in bearings 104. The upper end of the shaft 102 is provided with a hand wheel 106 which, when turned, causes the vertical shaft 62 to be rotated. When the shaft 62 is rotated, a set of arms 108 pinned to the shaft are caused to engage a number of set screws 110 threaded in lug portions of the follower levers 60 to cause them to be rotated away from the cams.

The power driven jack actuating mechanisms are best shown in Figs. 1 to 4, and comprise a vertical rotating shaft 112 on which are carried a series of hub members 113, 114, and 115. Extending radially from the hub members are a number of disks 116 having substantially parallel opposed surfaces. There are two disks on the hub member 113 and three on each of the hub members 114 and 115, the spacing of the disks on the hub members being the same. Between the disks on each hub member there is wedged a pair of rolls 117 arranged on edge, each formed of a number of relatively thin washers (see Figs. 10 and 11) mounted at either side of a central flange extending radially from a stud 118. The studs 118 are rotatably mounted in carriers 119 constructed to hold two of the rolls edge to edge between the disks 116.

Each roll supporting carrier 119 is made in two parts joined together by screws 120 and a bolt 121 to insure that the washers of the rolls will be held together when wedged between the disks. The side parts of each carrier are cut away at 122 to form a yielding end section in the carrier which will flex slightly when the rolls 117 are forced against each other by the wedging action of the disks.

When the power driven shaft 112 is rotated, the rolls 117 will revolve in opposite directions on each pair of studs 118 between disks 116. So long as the axes of a pair of studs 118 are maintained in a substantially radial relation to the power driven shaft 112, the position of the carrier in which the studs are mounted will remain unchanged. If the angular position of a carrier 119 about an axis parallel to shaft 112 is shifted, the rotation of the disks 116 will cause the rolls 117 to travel towards or from the shaft. To determine the angular position of the carriers supporting the rolls 117, the carriers are connected to the cam followers 58, and when the carriers are moved towards and from the shaft 112 corresponding positioning movements are imparted to the jack supporting structure through other connections provided for the purpose.

Each carrier 119, as shown in Figs. 10 and 11, is connected to a forked support arm of a lever 123 fulcrumed on a vertical shaft 124 supported in the frame of the machine close to the power driven shaft 112. The position of this shaft is the same as the shaft on which the cam followers are fulcrumed in the patented machines. Each carrier is connected to one portion of the forked lever arms by a pair of parallel links 125 and to the other portion of the arm by a yoke-shaped double link 126 disposed at an angle to the parallel links 125. The pivotal connections and the proportions of the links connecting each support lever and carrier are so arranged that when the angular position of the carrier is changed about the points of engagement of the rolls 117 and disks 116, substantially no movement of the supporting lever will take place about its fulcrum shaft 124. For this reason, a change in the angular position of the carriers will have no direct effect upon the position of the support levers, except as the carriers are moved towards and from the shaft 112 by the rotation of disks 116. As a result of this arrangement, the force applied by the disks 116 tending to move the carriers 119 towards and from the shaft 112 will apply substantially no force to the cam actuated connections so that the reactions of the forces required to provide the positioning movements on the cams are very small.

The connections between the jack supporting structure and the levers 123 for supporting the carriers include a number of link and lever connections substantially the same as the cam actuated connections in the machines of the above mentioned patents to which reference may be had for a more complete description. To provide necessary clearances between moving parts, one of the links, indicated at 127 (Figs. 1 and 2) connected to the uppermost carrier supporting lever 123 is forked at one end and other operating connections pass between the forked portions.

The connections for changing the angular positions of the carriers 119 comprise arms extending from each carrier and links 128 connecting the arms with the corresponding follower levers 60. Whenever a follower lever 60 is moved, the corresponding carrier 119 will be moved to a definite angular position determined by the degree of movement imparted to the arm by the follower lever, this angular movement taking place about a vertical axis passing through the points of engagement of the rolls 117 and disk 116. As viewed in Figures 5 and 11, angular movement of the carrier 119 in a direction to cause its arm to swing towards the shaft 112 will cause the carrier to be moved bodily towards the shaft until the carrier is returned to its original angular position with the axes of rolls 117 radial to the shaft. The same result is effected during movement of the carrier away from the shaft.

When the carriers and the rolls are moved outwardly away from the power driven shaft 112, there is a tendency for the disks 116 to yield against the pressures exerted by the rolls wedged between them. To offset this tendency, the distances between adjacent disks at their rims is made slightly smaller than the distances between the disks close to the shaft 112 so that slight yielding movement of the disks as the rolls move towards the rims will cause no decrease in pressures against the rolls by the disks.

The shaft 112 for the rotary disks is rotated by driving connections to the main motor driven shaft 10, as best shown in Figs. 2 and 3. At the upper end of shaft 112 is a gear 129 meshing with a similar gear 130 rotating loosely at the upper end of the shaft 124. Formed integrally with gear 130 is a smaller gear 133 meshing with a gear 134 of the same size supported by a short vertical shaft 135. On the hub of gear 134 is a still smaller spur gear 136 engaging a gear 137 secured to the downwardly extending end of the main driving shaft 10. The ratios of the gears are so proportioned that the power driven shaft 112 rotates at a relatively high speed and the motions produced by the cams on the pattern cam shaft, therefore, will be reproduced in the jack actuating connections without loss of time.

The pattern cam shaft 47 is driven during sewing operations through connections including a gear wheel 138 (Fig. 3) on the upper end of the cam shaft, elongated pinion teeth 140 formed on the vertical bushing member 86 which engage the gear wheel, gear teeth 142 at the upper end of the vertical bushing 86, a worm gear 144 meshing with the gear teeth 142, a horizontal shaft 146 at one end of which the worm gear 144 is secured and the other end of which is connected with a similar shaft 148, a variable speed driving mechanism 152, a helical gear 150 on the shaft 148 having a helical gear 154 meshing with the gear 150, a vertical shaft 155 forming a part of the variable speed driving mechanism, and a gear 156 at the upper end of shaft 155, which gear meshes with the gear teeth 38 on the driven clutch member 14.

To actuate the driving and stopping mechanism when the sewing is completed, there is mounted at the rear of the machine to the left of the pattern cam shaft (Figs. 2, 3, 6 and 9) a gear 158 having a disk member 160 secured to its upper surface. The gear 158 is rotatable on a short vertical stud 162 fixed in the machine frame and the gear is driven at the same speed as the pattern cam shaft. The gear 158 meshes with a pinion gear 164 engaging the upper end of the elongated pinion teeth 140, the gear ratios being the same as the ratios between the pinion teeth 140 and the gear 138 on the pattern cam shaft. As the sewing operation is being completed, a projection on the disk 160 causes a roll 166 to be moved forwardly to actuate the driving and stopping mechanism. The roll 166 is mounted on the end of an arm 168 rotatable on a short shaft 170 also forming an axis for gear 164. The arm 168 is pivotally connected by a link 172 to a lever 174 having a fulcrum 176 at one end on the main base 2. The other end of the lever 174 is pivotally connected with a link 178 extending forwardly of the machine, and cooperating with a dog 180 in the driving and stopping mechanisms as described more fully in the patents above noted. When the cam shaft 47 has nearly completed its rotation, movement of the roll 166 causes forward movement of dog 180 and the sewing and cam shafts are brought to rest by the driving and stopping mechanisms.

When the pattern cam shaft and the sewing devices are brought to rest by the driving and stopping mechanism, auxiliary power driven mechanism is thrown into operation to complete the rotation of the pattern cam shaft and to perform certain other incidental operations. The auxiliary power driven mechanism for completing the rotation of the cam shaft 47 of the illustrated machine comprises an auxiliary clutch 182 and an eccentric 184 (see Figs. 1, 2 and 3) driven by a downwardly extending part of the main drive shaft 10 through one complete revolution after which the auxiliary clutch disconnects the eccentric. The eccentric is surrounded by an eccentric strap 186 connected to an arm 188 fixed to the upper end of a vertical stud 190, the lower end of which carries an arm 192 oscillated thereby. Pivotally connected to the arm 192 is the forward end of a horizontal link 194, the rearward end of which (see Fig. 6) is slotted and surrounds a stud 196 extending downwardly from an arm 198 rotatably mounted on the lower end of stud 162. When the eccentric 184 is rotated, the arm 198 is moved first forwardly and then rearwardly. The arm 198 pivotally supports a pawl 200 held by a spring 201 in engagement with a disk 202 secured to the under side of the gear 158. The disk 202 is formed with a lug which, during the forward movement of the arm 198, moves the pawl 200 to the left and, when the arm is moved rearwardly, the pawl engages the end of the lug, and rotates the gear 158. Rotation of the gear 158 by the pawl causes the rotation of the pattern cam shaft, in the direction of the arrows in Fig. 2 to be completed.

To render the pattern cam shaft free to rotate after being stopped by the driving and stopping mechanism, the main driving connections therefor are broken before the rearward movement of the pawl 200 is started. To break the driving connections, the worm gear 144 is moved away from the gear teeth 140 and a universal joint 204 (see Figs. 2 and 3) is provided between shaft 148 held in a fixed bearing 206 and the aligned shaft 146 to permit this movement. The shaft 146 is mounted in a floating bearing block 208 as shown in Figs. 14 and 15, and is guided in a slotted portion 210 of the frame, the slot therein extending horizontally. Connected with the bearing block 208 by a link 212 is an arm 214 (see Fig. 6) secured to the upper end of a short vertical shaft 216 rotatable in the machine base 2. On the lower end of the shaft 216 is secured an arm 218 having a vertical stud 220 arranged to be engaged by a cam surface 222 on the link 194. The connections are such that during forward movement of link 194 the worm gear 144 is disengaged from gear teeth 142 and, during the rearward movement of the link, a spring 224 (Figs. 6 and 7) connected between the bearing block 208 and a stud 226 on the frame draws the worm back into engagement with the worm wheel. In case the rearward movement of link 194 is not quite complete at the time worm 144 is brought against gear teeth 142, a slight relative movement is permitted between arm 198 and the link 194 by reason of the slot in the end of the link. A spring 228 (Figs. 6, 8 and 9) is connected between the pin 196 on arm 198 and a screw 230 on the rearward end of the link 194 to yieldingly hold the arm in its rearmost position with relation thereto.

The nature and scope of the present invention having been indicated, and a machine embodying the several features of the invention having been specifically described, what is claimed is:

1. A shoe machine having, in combination, means for operating on a shoe, a shoe supporting jack movable to transfer the point of operation about the shoe, a power driven member, connections actuated by said member for imparting relative positioning movements to the operating means and jack as the point of operation is transferred around the shoe, a pattern cam, a follower engaging the cam, and mechanism actuated by the follower and acting on said connections to cause the movements of the follower to be transmitted in amplified form by the power driven member through said connections to the operating means and jack.

2. A shoe machine having, in combination, means for operating on a shoe and a shoe supporting jack relatively movable to transfer the point of operation about the shoe, power driven mechanism for imparting relative positioning movements to the operating means and jack as the point of operation is transferred around the shoe, a pattern cam, a follower engaging the cam, and connections actuated by the cam and acting on said mechanism to cause the movements of the follower to be transmitted in amplified form to the operating means and jack.

3. A shoe machine having, in combination, means for operating on a shoe and a shoe supporting jack relatively movable to transfer the point of operation about the shoe, a power driven member, connections actuated by the power driven member for imparting relative positioning movements to the operating means and jack as the point of operation is transferred around the shoe, said connections comprising a member engaging the driven member, a pattern cam, a follower engaging the cam, and means actuated by the follower and acting on the engaging member to cause the movements of the follower to be transmitted in amplified form by the power driven member through said engaging member to the operating means and jack.

4. A machine for use in the manufacture of shoes having, in combination, means for operating on a work piece, means for relatively moving the work piece and operating means during the operation on the work piece comprising power driven mechanism, a pattern cam, a follower engaging the cam, and connections actuated by the follower and acting on said mechanism to cause the movements of the follower to be transmitted in amplified form by said mechanism to the operating means and work piece.

5. A shoe machine having, in combination, means for operating on a shoe, a shoe supporting jack movable to transfer the point of operation about the shoe, a plurality of separate power driven trains of mechanism for imparting relative positioning movements to the operating means and jack as the point of operation is transferred around the shoe, and means acting on said trains of mechanism to determine the relative movements imparted to the operating means and jack comprising a plurality of sets of cams, and means for relatively adjusting said sets of cams and trains of mechanism to bring the cams of any set into cooperative relation with said trains of mechanism.

6. A machine for use in the manufacture of shoes having, in combination, means for operating on a work piece, a power driven member, connections actuated by the power driven member for imparting relative movements to the work piece and operating means during the operation on the work piece, said connections comprising a member engaging the driven member, a pattern cam, a follower engaging the cam, and mechanism actuated by the follower and acting on the engaging member to cause the movements of the follower to be transmitted in amplified form by the power driven member through said engaging member to the operating means and work piece.

7. A machine for use in the manufacture of shoes having, in combination, means for operating on a work piece, a power driven member having a travelling surface, a roll engaging said surface, a carrier for the roll movable transversely of the direction of travel of said surface, connections actuated by the transverse movements of the carrier for imparting relative movements to the work piece and operating means during the operation on the work piece, a pattern cam, and connections actuated by the cam for varying the angular position of the roll axis with relation to the direction of travel of the travelling surface to determine the relative movements imparted to the operating means and work piece.

8. A shoe machine having, in combination, means for operating on a shoe and a shoe supporting jack relatively movable to transfer the point of operation along the shoe, a cam shaft rotating once for each shoe operated upon, cams on the cam shaft, followers actuated by the cams, a rotating relay shaft, disc members on the relay shaft having continuous surfaces at right angles to the shaft, rolls having their axes radially of said shaft, carriers for supporting said rolls with their edges engaging said surfaces, connections operated by the carriers to impart relative positioning movements to the operating means and jack when the carriers are moved towards and from the shaft, and connections between the carriers and cam followers for shifting the position of the roll axes to cause movements of the carriers towards and from the shaft proportional to the movements of the follower.

9. A shoe machine having, in combination, means for operating on a shoe, a shoe supporting jack movable to transfer the point of operation along the shoe, a cam shaft rotating once for each shoe operated upon, a cam on the cam shaft for producing a motion corresponding to the proper relative positioning movements of the operating means and jack as the point of operation is transferred about the shoe, a follower actuated by the cam, a rotating relay shaft, a pair of discs on the relay shaft having opposed continuous surfaces at right angles to the shaft, a pair of rolls arranged with one of said pair engaging the surface of each disk, a carrier for maintaining the rolls in proper position between the disks, connections operated by movement of said carrier between said disks to change the relative positions of the operating means and jack, and connections between the carrier and cam follower for shifting the position of the carrier about an axis parallel to the relay shaft to cause movements of the carrier proportional to the movements of the follower.

10. A machine of the class described having, in combination, a rotating shaft, a disk having a surface at right angles to said shaft, a carrier, a roll rotatable on the carrier to engage the surface of the disk, a support on which the carrier is movable parallel to the surface of the disk, means for changing the angular relation of the carrier and support to cause the roll to move the carrier along the disk and angularly disposed links connecting the carrier and support to cause said angular movement of the carrier to take place substantially about the point of engagement of the roll and disk as a center.

11. A machine for use in the manufacture of shoes having, in combination, means for operating on a work piece, a main driver for the machine, means comprising power driven mechanism for relatively moving the work piece and the operating means during the operation on the work piece, means acting to determine the relative movements imparted to the operating means and work piece comprising a pattern cam connected with the operating means, a driving and stopping mechanism for starting the machine and for bringing the machine to rest, means operated before the pattern cam has completed its rotation for actuating the driving and stopping mechanism to stop the operating means and pattern cam, connections actuated by the main driver after the operating means is brought to rest to complete the rotation of the pattern cam, and means for disconnecting the pattern cam from the operating means when the main driver acts to complete the rotation of the pattern cam.

LAURENCE E. TOPHAM.